United States Patent
Watzenberger et al.

(10) Patent No.: US 6,299,734 B1
(45) Date of Patent: *Oct. 9, 2001

(54) PREPARATION OF AN AQUEOUS SOLUTION OF FREE HYDROXYLAMINE

(75) Inventors: Otto Watzenberger, Mannheim; Peter Mauer, Kallstadt; Eckhard Ströfer, Mannheim; Heiner Schelling, Kirchheim; Hans-Michael Schneider, Worms, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 days.

(21) Appl. No.: 09/122,099

(22) Filed: Jul. 24, 1998

(30) Foreign Application Priority Data

Aug. 4, 1997 (DE) ............................................. 197 33 681

(51) Int. Cl.[7] ............................... B01D 3/34; B01D 3/38; C01B 21/14
(52) U.S. Cl. .................................. 203/6; 203/14; 203/28; 203/75; 203/76; 203/77; 203/78; 203/79; 203/80; 423/387
(58) Field of Search .................................. 203/78, 6, 14, 203/79, 80, 92, 93, 94, 96–99, DIG. 19, 28, 75, 76, 77; 423/387; 159/16.3, DIG. 20, DIG. 10

(56) References Cited

U.S. PATENT DOCUMENTS

| 3,351,426 | 11/1967 | Leaver et al. ........................... 23/114 |
| 4,147,623 | 4/1979 | Koff et al. .............................. 210/31 |
| 4,654,579 | 3/1987 | Weiss et al. .......................... 204/182 |
| 4,778,669 | 10/1988 | Fuchs et al. .......................... 423/387 |
| 4,956,168 | 9/1990 | Wagaman .............................. 423/386 |
| 5,472,679 | 12/1995 | Levinthal et al. .................... 423/387 |
| 5,510,097 | * 4/1996 | Cawlfield et al. .................... 423/387 |
| 5,837,107 | * 11/1998 | Watzenberger et al. ............... 203/78 |

FOREIGN PATENT DOCUMENTS

| 3528463 | 8/1985 | (DE) . |
| 001787 | 9/1981 | (EP) . |
| 108294 | 5/1984 | (EP) . |
| 237052 | 3/1986 | (EP) . |
| 97/22550 | 6/1997 | (WO) . |
| 97/22551 | 6/1997 | (WO) . |

OTHER PUBLICATIONS

Z. Anorg. Chem., 228 (1956) pp. 28–35.

Roth–Heller, *Gefahrliche Chem. Reaktionen*, Stoffinformmation Hydroxylamin, p. 3, 1984.

* cited by examiner

Primary Examiner—Virginia Manoharan
(74) Attorney, Agent, or Firm—Keil & Weinkauf

(57) ABSTRACT

An aqueous solution of free hydroxylamine is prepared by treating a hydroxylammonium salt with ammonia by the countercurrent method in a stripping column by a process in which hydroxylamine is liberated and at the same time the solution obtained is separated by distillation into an aqueous hydroxylamine solution and a salt fraction. The novel process can be carried out in a simple and gentle manner and on a large scale. The danger of decomposition is minimized owing to the low thermal load, the low concentration of hydroxylamine and the short residence time in the process.

11 Claims, 2 Drawing Sheets

PREPARATION OF AN AQUEOUS SOLUTION OF FREE HYDROXYLAMINE

The present invention relates to a process for the preparation of metal ion-free aqueous solutions of free hydroxylamine.

Hydroxylamine is an important intermediate for the chemical industry. However, particular caution is required in handling it because it irritates the eyes, the skin and the mucous membranes and can cause allergies. In particular, however, it is thermally unstable, ie. it decomposes slowly to explosively, especially in the presence of metal ions, in a strongly basic medium and in relatively high concentration.

Hydroxylamine is produced on a large industrial scale as hydroxylammonium salt, usually as hydroxylammonium sulfate, and is also used as such. Frequently, however, it is necessary to use a highly concentrated salt- and metal ion-free aqueous solution of free hydroxylamine. In order to avoid the abovementioned problems and in particular the instability of the hydroxylamine, those skilled in the art have avoided the use of traditional methods of large-scale chemistry for concentrating distillable substances, for example distillation, in the recovery of salt-free hydroxylamine solutions. The distillation of hydroxylamine, even on the laboratory scale, is even said to be a particularly dangerous operation; cf. Roth-Weller: Gefährliche Chemische Reaktionen, Stoffinformationen Hydroxylamin, page 3, 1984, 2, Ecomed-Verlag. The distillation of hydroxylamine on an industrial scale has therefore also never been considered in technical publications. Instead, special methods have been used, although all of them have serious disadvantages.

Attempts were thus made to isolate free hydroxylamine from aqueous salt solutions with the aid of ion exchangers; cf., for example, U.S. Pat. No. 4,147,623, EP-A-1787, EP-A-237052 and Z. Anorg. Ch. 288, 28–35 (1956). However, such a process leads only to dilute solutions with low space-time yields. Moreover, hydroxylamine reacts with many ion exchangers or is decomposed by them.

A further method comprises the electrodialysis of an aqueous hydroxylammonium salt solution in electrolysis cells with semipermeable membranes, as described, for example, in DE-A-33 47 259, JP-A-123771 and JP-A-123772. However, such a process is technically complicated and expensive and has to date not become established in industry.

DE-A-35 28 463 discloses the preparation of free hydroxylamine from hydroxylammonium sulfate by treatment with calcium oxide, strontium oxide or barium oxide and removal of the insoluble alkaline earth metal sulfates. In this method, the removal of the sulfates obtained in finely divided form presents considerable difficulties. In addition, only dilute solutions are obtained and, when calcium oxide or calcium hydroxide is used, free hydroxylamine still contains undesirably large amounts of ions owing to the relatively good solubility of the calcium sulfate. When strontium compounds and barium compounds are used, the relatively high price and especially the toxicity are moreover disadvantages with regard to an industrial production process.

DE-A-12 47 282 describes a process in which alcoholic solutions of free hydroxylamine are obtained by reacting hydroxylammonium sulfate with ammonia in alcohol as a solvent and removing the ammonium sulfate. A similar process is described in EP-A-108 294. However, alcoholic solutions are unsuitable and undesirable for a number of applications. For example, particular precautions must be taken during the handling of such solutions, owing to their flammability. Furthermore, the alcohol used must as a rule be recovered by an expensive procedure, since the discharge of relatively large amounts of alcohol into wastewater treatment plants or into outfalls is prohibited.

Finally, DE-A-36 01 803 describes a process for obtaining aqueous solutions of free hydroxylamine, in which hydroxylammonium sulfate is reacted with ammonia in lower alcohols, the precipitated ammonium sulfate is separated off, water is added to the alcoholic solution of free hydroxylamine and the alcohol is distilled off from the solution thus obtained. The abovementioned disadvantages of working with alcohol are applicable to this process too. Moreover, owing to the instability of the hydroxylamine in conjunction with the flammability of the alcohols, particular caution is required in the final distillation stage. Common to all prior art processes is that they are not suitable for being carried out on an industrial scale or give rise to uneconomically high additional safety costs.

A temperature above 65° C. is regarded as critical for the decomposition of hydroxylamine. In a differential thermal analysis, the onset temperature of a 50% strength by weight aqueous hydroxylamine solution (in a glass crucible) was determined as 70° C. The quantity of heat evolved, about 2.2 kJ/g of 50% strength by weight solution, confirms the high thermal potential of the substance. The differential thermal analysis is a microthermal analytical method which is used for estimating the thermal stability and the thermal potential. The onset temperature is the lowest ambient temperature at which a marked exothermic reaction takes place in the sample at the heating rate of 1 K/min, starting at 30° C. For safety reasons, processing temperatures should be substantially below the onset temperature.

Thus, in connection with the preparation of hydroxylamine nitrate, U.S. Pat. No. 4,956,168 states that a suspension of hydroxylamine sulfate in alcohol is prepared at a temperature which does not exceed 65° C. This suspension is then treated with ammonia at ≦65° C. in order to prepare an alcoholic hydroxylamine solution.

U.S. Pat. No. 5,472,679 in turn describes a process for the preparation of an alcohol-free, aqueous hydroxylamine solution by reacting a hydroxylamine sulfate solution with a suitable base at up to about 60° C. The mixture obtained is then subjected to a distillation under reduced pressure at less than 65° C. A solid residue (the salt formed on liberation of the hydroxylamine) and, as the distillate, an aqueous hydroxylamine solution which contains from 16 to 23% by weight of hydroxylamine are obtained. This process has the disadvantage that it is carried out under reduced pressure and that the temperature must be very carefully controlled. It also has the following further disadvantages:

The precipitate makes it necessary to work with solids. In a continuous process, the solid would accordingly have to be continuously removed. This may present considerable process engineering problems if it is a solid which tends to cake, as, for example, in the case of sodium sulfate.

The distillation to dryness, correctly referred to as evaporating down, takes place in such a way that the low boiler water evaporates off first. The concentration of the high boiler hydroxylamine increases. It is known that the tendency of hydroxylamine to decompose increases with the concentration of hydroxylamine. Consequently, the losses of hydroxylamine increase during the process. There is a growing risk that, owing to the high concentration of hydroxylamine, an explosive decomposition may occur. It is known that pure hydroxylamine or hydroxylamine in a concentration of >70% by weight can decompose explosively. Thus, appropriate safety requirements must be met for the stated process.

The remaining solid will still contain residues of hydroxylamine (hydroxylamine adsorbed onto the surface, hydroxylamine in voids in the solid). The solid must therefore be decontaminated in a separate disposal procedure.

Hence, evaporating down is not a process which can be carried out advantageously on a large industrial scale.

WO 97/22551 describes a process for the preparation of aqueous solutions of free hydroxylamine. A hydroxylammonium salt is treated with a suitable base in water, any insoluble constituents are separated off from the resulting solution, the solution obtained is separated into an aqueous hydroxylamine fraction and salt fraction by distillation at above 80° C. and, if desired, the aqueous hydroxylamine solution obtained is concentrated in a distillation column by taking off water via the top of this column.

This process gives a complete yield of free hydroxylamine only when strong bases are used for liberating the hydroxylamine. For economic reasons, sodium hydroxide solution is preferably used as a cheap strong base on a large industrial scale. Sodium sulfate is then formed as a by-product of the hydroxylamine liberation. This salt is obtained as an aqueous solution. In the stated process, the liberated hydroxylamine is separated from the salt solution by stripping with steam. The feed to the stripping column must not contain a solid (precipitated salt), in order to avoid blocking the column. In this process with the use of sodium hydroxide solution, the solubility limit of sodium sulfate in the aqueous hydroxylamine solution therefore imposes a limitation. The solubility of sodium sulfate in an about 10% strength by weight aqueous hydroxylamine solution is about 24% by weight at 100° C. Owing to this low solubility, the concentration of free hydroxylamine in the liberation solution is also limited to about 10% by weight at the most, unless a solid separation stage is included upstream. However, owing to the ready decomposability of the hydroxylamine, its sensitizing effect and the tendency of sodium sulfate to cake, this procedure is avoided in industry if at all possible.

The hydroxylamine concentration limited by the solubility of the sodium sulfate limits the maximum achievable capacity of the industrial plant. In addition, the use of sodium hydroxide solution inevitably leads to the product solution always containing metal ions (sodium ions), even if only in a small amount.

It would be of considerable technical and economic advantage if it were possible alternatively to use cheap ammonia. The water solubility of ammonium sulfate, 50.9% by weight at 100° C., is more than twice as high as that of sodium sulfate. The hydroxylamine concentration and hence the plant capacity could thus be much more than doubled. The ammonium sulfate obtained in the neutralization can moreover be further used as valuable fertilizer, whereas sodium sulfate must be discharged as a useless impurity. By using ammonia as the base for the hydroxylamine liberation, the introduction of metal ions into the product is automatically ruled out.

However, ammonia is a much weaker base than sodium hydroxide solution. While hydroxylamine can be completely displaced from hydroxylammonium sulfate by means of sodium hydroxide solution, this cannot be achieved with ammonia. Owing to the resulting equilibrium

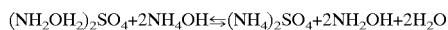
$(NH_2OH_2)_2SO_4 + 2NH_4OH \leftrightharpoons (NH_4)_2SO_4 + 2NH_2OH + 2H_2O$ only about 60–70% of the hydroxylamine present are liberated. The remainder continues to be present in the bound form as sulfate. Accordingly, only a hydroxylamine yield of 60–70% can be achieved by the abovementioned stripping method. More than 30% of the hydroxylamine would leave the stripping column as hydroxylammonium sulfate via the bottom for wastewater treatment and would thus be lost to industrial utilization. This high hydroxylammonium load would furthermore necessitate an expensive wastewater treatment facility. The use of ammonia is thus not an economical alternative for the simple stripping method.

It is an object of the present invention to provide a process for the preparation of aqueous, metal ion-free solutions of free hydroxylamine which can be carried out simply and on an industrial scale and permits the use of economical ammonia for the complete liberation and isolation of metal ion-free hydroxylamine.

We have found surprisingly, that this object is achieved if the hydroxylammonium salt in the aqueous phase is treated with ammonia by the countercurrent method and at the same time the solution obtained is separated into an aqueous hydroxylamine solution and a salt fraction by stripping with steam.

The present invention therefore relates to a process for the preparation of an aqueous solution of free hydroxylamine by treating a hydroxylammonium salt solution with a base and separating the resulting solution by distillation into an aqueous hydroxylamine solution and a salt fraction, wherein the solution is treated with ammonia or ammonia water as the base by the countercurrent method and at the same time separation is effected by treatment with water and/or steam.

The hydroxylammonium salts used are in general the hydroxylammonium salts of mineral acids, for example of sulfuric acid, phosphoric acid or hydrochloric acid, usually in aqueous solution.

The hydroxylammonium salt is treated in countercurrent flow with ammonia or ammonia water in aqueous solution. Instead of ammonia, other volatile bases are also suitable. Useful volatile bases are, for example, mono-, di- or trialkylamines, such as methylamine, dimethylamine, trimethylamine, ethylamine, diethylamine or triethylamine, mono-, di- or trialkanolamines, such as diethanolamine, and cyclic amines, such as pyrrolidine or piperidine. The amount of the base is chosen so that the hydroxylammonium salt is converted completely or at least to a predominant extent into free hydroxylamine. This may be effected continuously or batchwise and at from about 10° to 120° C. An aqueous solution which contains free hydroxylamine and a hydroxylamine-free solution which contains the salt originating from the base cation and the acid anion present in the hydroxylammonium salt are obtained.

The hydroxylamine liberation and the separation of the resulting solution into an aqueous hydroxylamine solution and a salt fraction are preferably carried out by treatment with ammonia and steam by the countercurrent method with the aid of a stripping column (stripping/reaction column). This is provided with conventional trays, for example sieve trays or bubble trays, or with a conventional packing, for example Raschig rings, Pall rings, saddle elements, etc., and preferably has from 10 to 60 theoretical plates. The hydroxylammonium salt solution, to which further stabilizer may, if required, be added, is fed directly to the top of the column (upper part of the packing or uppermost or one of the uppermost trays).

In the stripping column, the neutralization and the separation of the solution are carried out in such a way that the salt fraction is taken off at the bottom of the column and an aqueous hydroxylamine solution at the height of the feed tray, or above it. In order to achieve this, it is necessary to treat the hydroxylammonium salt solution by passing ammonia or ammonia water and water and/or steam countercurrent into the bottom of the column. When water and/or ammonia water are passed in, the bottom should be appropriately heated by heat exchangers in order to evaporate the aqueous solutions. When ammonia water is used, the amount of water or steam to be passed in may be reduced or the introduction thereof dispensed with. However, it may then be necessary to heat the bottom.

At a hydroxylammonium sulfate concentration of from 5 to 80% by weight in the feed solution, the flow rate of water or steam is in general from 1 to 8, in particular from 1 to 5, times the feed rate. The temperature of the steam introduced is in general from 80 to 180° C.

The pressure in the stripping/reaction column is in general from 5 to 300 kPa (from 0.05 to 3 bar), preferably from 10 to 110 kPa (from 0.1 to 1.1 bar). It is particularly preferable to operate the stripping/reaction column at from 50 to 110 kPa (from 0.5 to 1.1 bar), in particular at atmospheric pressure.

The temperatures prevailing in the stripping/reaction column depend on the pressure at which the column is operated. They are in general from 30 to 130° C., preferably 80 to 130° C.

The aqueous (vaporous or liquid) hydroxylamine fraction taken off via the top of the stripping/reaction column usually contains 20–300 g of hydroxylamine/l and may, if desired, be concentrated in a distillation column of conventional industrial design. A column having from 4 to 30 theoretical plates is preferred. The addition of stabilizer may be advantageous.

The hydroxylamine solution obtained may, if desired, be concentrated in a distillation column. It may be advantageous to add further stabilizer before the distillation. The hydroxylamine solution is preferably fed in at a height of about one third of the theoretical plates of the distillation column. In the distillation column, substantially hydroxylamine-free water is obtained at the top and a hydroxylamine solution whose concentration depends on the distillation conditions is obtained at the bottom.

In general, the distillation column is operated at from 1 to 200 kPa (from 0.01 to 2 bar), preferably from 5 to 120 kPa (from 0.05 to 1.2 bar), particularly preferably from 10 to 110 kPa (from 0.1 to 1.1 bar). The higher the intended final concentration of hydroxylamine, the gentler (low pressure and low temperature) the distillation must be. The distillation may be carried out continuously or batchwise.

The water or the vapor taken off via the top of the distillation column may be recycled, directly or after compression or superheating, as stripping steam to the bottom of the stripping/reaction column or passed as wastewater for wastewater treatment.

If required, a means for separating off entrained droplets (eg. a demister) may be installed above the feed tray.

In a particularly preferred embodiment, the neutralization with ammonia is carried out by the countercurrent method and the stripping of the hydroxylamine from the salt solution is effected in combination with partial concentration of the hydroxylamine solution in only one column, ie. a stripping/reaction/distillation column. Water is distilled off via the top and the concentrated hydroxylamine solution is removed about 1 to 3 trays above the feed of the salt solution containing hydroxylammonium sulfate. The salt solution is fed in roughly in the middle of the column (from about 10 to 40 theoretical plates above the bottom). The required ammonia or the ammonia water is fed in either directly at the bottom or, preferably, from 1 to 5 trays above the bottom.

The latter method has the advantage that the trays below the ammonia feed point serve for completely stripping the ammonia from the bottom discharge solution below the feed point.

The hydroxylamine-free salt fraction is taken off as a bottom product of the column. The number of theoretical plates in the stripping/reaction/distillation column is in general from 20 to 50 and the reflux ratio in the rectification section is adjusted so that it is from 0.5 to 3. Otherwise, the stripping/reaction/distillation column is operated as described above.

The novel process stage has the advantage that it can be carried out in a simple and gentle manner. The introduction of metal ions is reliably avoided. The use of flammable substances and of solids is avoided. The concentration of hydroxylamine is low over the entire process. For example, it is less than 30% by weight in the stripping/reaction column and stripping/reaction/distillation column. Owing to the mode of operation of the stripping/reaction column and stripping/reaction/distillation column, the liquid hold-up is minimal and the residence time in the process is relatively short. Moreover, the mode of operation of the stripping/reaction column and stripping/reaction/distillation column makes it possible to employ higher pressures, in particular atmospheric pressure.

Owing to the relatively short residence times, the hydroxylamine liberation in the stripping/reaction column and stripping/reaction/distillation column can, if desired, also be carried out without the addition of stabilizer. The decomposition which takes place is only slightly higher than that of stabilized solutions. The addition of suitable stabilizers, as described, for example, in WO 97/22551, can reduce the hydroxylamine decomposition to a minimum.

Higher hydroxylamine concentrations occur only during concentration in the distillation column. The hydroxylamine concentration can be adjusted as desired, for example in the range from 30 to 70% by weight. In order to reduce the risk of decomposition, stabilizer may be introduced into the solution to be distilled.

The apparatuses required for the novel process can be produced from nonmetallic materials, such as glass, ceramic and plastics. The decomposition initiated by metal ions is thus ruled out. Surprisingly, however, it has been found that the apparatuses may also be produced from special metallic materials, such as platinum or gold, without significantly higher decomposition of the hydroxylamine being observed.

Owing to the simple but at the same time safe process design, only a small capital cost is necessary for carrying out the novel process on an industrial scale. Moreover, the process can be scaled up virtually as desired.

Figure 1:
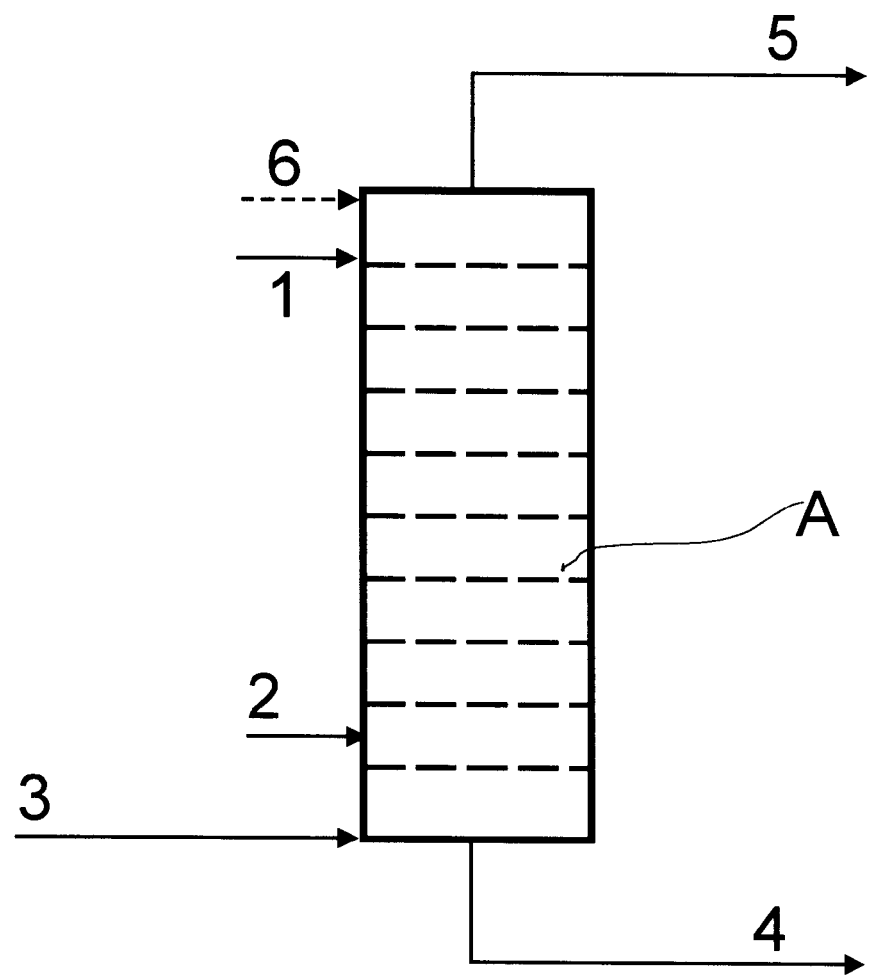
FIG. 1 is a flow chart illustrating one embodiment of the invention.

According to FIG. 1, the hydroxylamine liberation and the hydroxylamine isolation are carried out in a stripping/reaction column A, the hydroxylammonium salt solution 1 being fed to the top of the column. Ammonia 2 and steam 3 are passed into the bottom of the column. The separation is effected by taking off substantially hydroxylamine-free salt solution 4 at the bottom of the column and a salt-free aqueous hydroxylamine fraction 5 (in vaporous or liquid form) via the top. If desired, stabilizer 6 may be added at the top of the stripping column.

Figure 2:
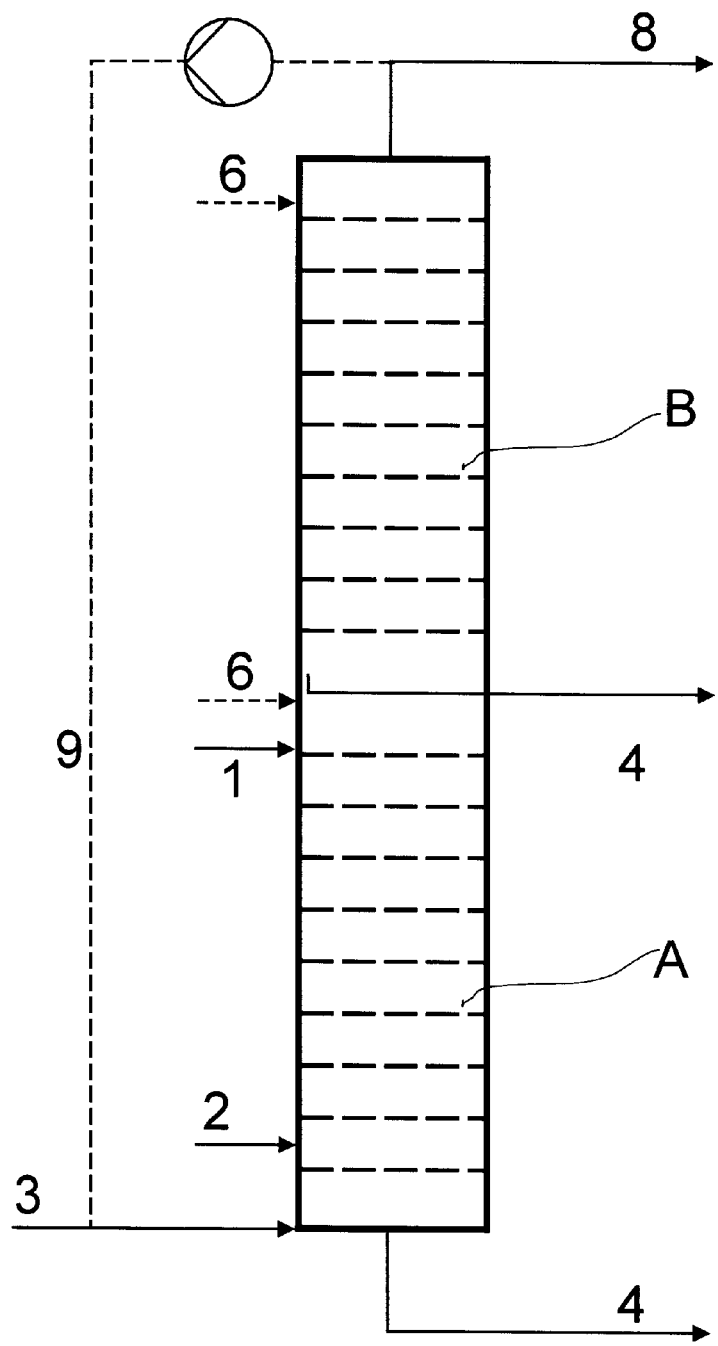
FIG. 2 is a flow chart which illustrates a second embodiment of the invention.

According to FIG. 2, the hydroxylamine salt solution 1 is fed into a stripping/reaction/distillation column A+B. The lower part of the column consists of a stripping section A and the upper part of a distillation section B. The hydroxylammonium salt solution 1 is fed in between these two sections, ie. to the top of the stripping section. The hydroxylamine liberation and hydroxylamine separation in the stripping/reaction/distillation column are carried out in such a way that the substantially hydroxylamine-free salt solution 4 is taken off at the bottom of the column and substantially hydroxylamine-free water 8 via the top. The salt-free hydroxylamine solution 5 which is from about 5 to 60% strength by weight is removed via a side take-off. If desired, stabilizer may be added to the top of the stripping column A 6 and/or to the top of the distillation column B 7.

The examples which follow illustrate the invention without restricting it.

The experiments were carried out in an experimental laboratory apparatus consisting essentially of a stirred kettle, a glass stripping column and a downstream glass distillation column with the corresponding storage containers, metering pumps, product containers on balances, steam connection to the bottom of the column and downstream condensers. The stripping column had an internal diameter of 50 mm, a height of 3000 mm and was filled with packings of 5 mm diameter. The distillation column was a double-jacket column which had an internal diameter of 45 mm and a height of 2.5 m and was filled with packings of 5 mm diameter.

The starting material was 25% strength by weight hydroxylammonium sulfate solution. If required, stabilizer was added to the hydroxylammonium sulfate solution. In the comparative examples, the solution was passed continuously by means of a pump into a 100 ml stirred glass kettle through which the flow was continuous. At the same time, base was added continuously to the stirred kettle by means of a pump in an amount sufficient to establish the desired neutralization point, detectable from the pH.

The base hydroxylamine was liberated by reaction with sodium hydroxide solution or ammonia.

The free base hydroxylamine was stripped from the aqueous salt solution with steam (from about 1 to 6 kg of steam/kg of feed) in the stripping column. The steam was passed directly into the bottom of the column. The salt solution was taken off continuously at the bottom of the column.

The vapor from the stripping column, containing from about 2 to 10% by weight of hydroxylamine, was passed into the lowermost tray of the downstream distillation column. Distillate (substantially hydroxylamine-free water) was taken off at the top of the distillation column. A part of the condensate was recycled to the column as reflux. Aqueous hydroxylamine solution (from 3 to 40% by weight of hydroxylamine) was taken off from the bottom.

COMPARATIVE EXAMPLE 1

Obtaining free hydroxylamine from hydroxylammonium sulfate using sodium hydroxide solution and subsequently separating an aqueous hydroxylamine solution from the sodium sulfate solution by stripping with steam in a column.

1012 g/h of stabilized hydroxylammonium sulfate solution and 296 g/h of 50% strength by weight sodium hydroxide solution were mixed continuously in a stirred kettle reactor and the discharge solution was passed directly to the top of the stripping column. The feed solution contained about 8.2% by weight of hydroxylamine. 3500 g/h of steam were passed into the bottom of the stripping column. The vapor emerging at the top of the stripping column passed directly into the distillation column. This was operated with a reflux ratio of about 0.6 at atmospheric pressure. The bottom of the distillation column was not heated. The bottom liquid discharge was cooled and collected. It contained about 7% by weight of hydroxylamine. The solution discharge from the bottom of the stripping column contained about 0.2% by weight of hydroxylamine. The hydroxylamine losses over the total experimental apparatus as a result of decomposition were about 3.3% by weight. The yield of hydroxylamine was 94% by weight.

COMPARATIVE EXAMPLE 2

Obtaining free hydroxylamine from hydroxylammonium sulfate using ammonia and subsequently separating an aqueous hydroxylamine solution from the ammonium sulfate solution by stripping with steam in a column.

The experiment was carried out similarly to Example 1. 710 g/h of hydroxylammonium sulfate solution and 541 g/h of ammonia water (24.9% by weight of $NH_3$) were used. The feed solution contained about 6.1% by weight of hydroxylamine. The experimental conditions—pH, temperature and pressure—were the same as in Example 1. The discharge from the bottom of the distillation column contained only 3.3% by weight of hydroxylamine. On the other hand, the solution discharge from the bottom of the stripping column contained about 2.5% by weight of hydroxylamine. The hydroxylamine decomposition was about 6.6% by weight. The yield of hydroxylamine was only 59% by weight. Owing to the low base strength of the ammonia, only some of the hydroxylamine was liberated in the stirred kettle and about 32% by weight of the hydroxylamine used left the stripping column unconverted as hydroxylammonium sulfate via the bottom discharge.

EXAMPLE 1 obtaining free hydroxylamine from hydroxylammonium sulfate using ammonia in the countercurrent procedure by direct passage into the bottom of the stripping column while simultaneously separating an aqueous hydroxylamine solution from the ammonium sulfate solution by stripping with steam.

710 g/h of stabilized hydroxylammonium sulfate solution were passed directly to the top of the stripping column. 3500 g/h of 1.5 bar steam (about 130° C.) and at the same time 631 g/h of ammonia water were fed into the bottom of the stripping column. The solution discharge from the bottom of the stripping column contained about 0.16% by weight of hydroxylamine. The product discharged from the bottom of the distillation column contained 5.35% by weight of hydroxylamine. The hydroxylamine decomposition was about 3.5% by weight. The yield of hydroxylamine was thus 94% by weight. As a result of the countercurrent treatment, the hydroxylamine was thus surprisingly virtually completely liberated even by the weak base ammonia and at the same time isolated. Increased decomposition was not observed.

The result is all the more surprising since ammonia is only very slightly water-soluble under the operating conditions prevailing.

EXAMPLE 2 obtaining free hydroxylamine from hydroxylammonium sulfate using ammonia similarly to Example 1 but with a higher column loading and only stoichiometric addition of ammonia.

1421 g/h of stabilized hydroxylammonium sulfate solution were passed directly to the top of the stripping column.

3500 g/h of 1.5 bar steam and at the same time 370 g/h of ammonia water were fed into the bottom of the stripping column. The solution discharge from the bottom of the stripping column contained about 1.7% by weight of hydroxylamine. The product discharge from the bottom of the distillation column contained 8.7% by weight of hydroxylamine. The hydroxylamine decomposition was about 4.4% by weight. The yield of hydroxylamine was thus 82% by weight. Even with stoichiometric addition of ammonia and a substantially increased column loading, it was possible to achieve a hydroxylamine yield well above the equilibrium value (cf. Comparative Example 2). With optimum design of the stripping column and optimum column loading, a substantially higher hydroxylamine yield can be achieved here.

EXAMPLE 3

Obtaining free hydroxylamine from hydroxylammonium sulfate using ammonia in the countercurrent procedure by direct passage into the bottom of the stripping column while simultaneously separating an aqueous hydroxylamine solution from the ammonium sulfate solution by stripping with steam in the absence of stabilizer.

The experiment from Example 1 was repeated in the same manner (541 g/h instead of 631 g/h of ammonia water). However, no stabilizer was added to the hydroxylammonium sulfate solution, ie. the liberation and the isolation of the hydroxylamine were carried out in the complete absence of stabilizer. The solution discharge from the bottom of the stripping column once again contained only about 0.16% by weight of hydroxylamine. The product discharge from the bottom of the distillation column contained 5.2% by weight of hydroxylamine. The hydroxylamine decomposition was only about 4.4% by weight. The yield of hydroxylamine was thus 94% by weight. This experiment showed that the usual high yield can be achieved by the countercurrent treatment in a stripping column owing to the short residence time, even without the addition of stabilizer. The decomposition is only very slightly higher.

We claim:

1. A process for the preparation of an aqueous solution of free hydroxylamine which comprises feeding a hydroxylammonium salt solution into a stripping column and simultaneously passing water and/or steam and ammonia or ammonia water into the bottom of the column so as to treat the hydroxylammonium salt solution countercurrently with ammonia or ammonia water and, at the same time, separating the so obtained solution by distillation into an aqueous solution of free hydroxylamine and a salt fraction.

2. A process as claimed in claim 1, wherein said aqueous solution of free hydroxylamine is taken off via the top of the stripping column.

3. A process as claimed in claim 1, wherein the stripping column is operated at from 5 to 300 kPa.

4. The process of claim 3, wherein the stripping column is operated at from 10 to 110 kPa.

5. A process of claim 3, wherein the stripping column is operated at from 50 to 110 kPa.

6. A process as claimed in claim 1, wherein said aqueous solution of free hydroxylamine obtained is concentrated in a distillation column.

7. A process as defined in claim 6, wherein the distillation column is operated at from 1 to 200 kPa.

8. A process as claimed in claim 6, wherein the water obtained from the concentration of said aqueous solution of free hydroxylamine is recycled to the bottom of the stripping column.

9. A process as claimed in claim 6, wherein the separating of said aqueous solution of free hydroxylamine from said salt fraction and the concentration of said aqueous solution of free hydroxylamine are carried out in a combined stripping/reaction/distillation column.

10. A process as claimed in claim 9, wherein the removal of the resulting concentrated aqueous free hydroxylamine solution is carried out from 1 to 3 trays above the feed of the hydroxylammonium salt solution starting material and the water is taken off via the top and the salt fraction is taken off at the bottom of the column.

11. A process as claimed in claim 1, wherein a decomposition stabilizer is added to said aqueous solution of free hydroxylamine.

* * * * *